US009552287B2

(12) United States Patent
Pua et al.

(10) Patent No.: US 9,552,287 B2
(45) Date of Patent: Jan. 24, 2017

(54) DATA MANAGEMENT METHOD, MEMORY CONTROLLER AND EMBEDDED MEMORY STORAGE APPARATUS USING THE SAME

(75) Inventors: Khein-Seng Pua, Miaoli (TW); Jiunn-Yeong Yang, Keelung (TW); Kim-Hon Wong, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 562 days.

(21) Appl. No.: 13/089,325

(22) Filed: Apr. 19, 2011

(65) Prior Publication Data
US 2012/0166706 A1 Jun. 28, 2012

(30) Foreign Application Priority Data

Dec. 24, 2010 (TW) .............................. 99145897 A

(51) Int. Cl.
*G06F 12/02* (2006.01)
(52) U.S. Cl.
CPC ................. *G06F 12/0246* (2013.01)
(58) Field of Classification Search
CPC ...... G06F 12/00; G06F 12/02; G06F 12/0246; G06F 12/023; G06F 9/5016
USPC ........................................................ 711/103
See application file for complete search history.

(56) References Cited

U.S. PATENT DOCUMENTS

| 7,017,038 | B1 * | 3/2006 | LaChance et al. ............... 713/2 |
| 2003/0093612 | A1 * | 5/2003 | Ootani et al. .................. 711/103 |
| 2007/0206421 | A1 * | 9/2007 | Mokhlesi ............ G11C 11/5642 365/185.18 |
| 2007/0260817 | A1 * | 11/2007 | Ha ................... 711/118 |
| 2010/0017561 | A1 * | 1/2010 | Yang et al. ................... 711/103 |
| 2010/0169547 | A1 * | 7/2010 | Ou ................. 711/103 |
| 2011/0075482 | A1 * | 3/2011 | Shepard et al. .......... 365/185.11 |

FOREIGN PATENT DOCUMENTS

TW 201025468 7/2010

* cited by examiner

*Primary Examiner* — Ryan Bertram
*Assistant Examiner* — Trang Ta
(74) *Attorney, Agent, or Firm* — Jianq Chyun IP Office

(57) ABSTRACT

A data management method, a memory controller and an embedded memory storage apparatus are provided. The embedded memory storage apparatus has a plurality of physical blocks and each of the physical blocks has fast physical pages and slow physical pages. The method includes detecting a status of a state indication unit. The method further includes automatically reading data stored in the embedded memory storage apparatus, using the fast and slow physical pages of the embedded memory storage apparatus to re-store the data and marking status of the state indication unit as a second status when the status of the state indication unit is a first status. Accordingly, the storage space of the embedded memory storage apparatus can be efficiently used.

21 Claims, 9 Drawing Sheets

DATA MANAGEMENT METHOD, MEMORY CONTROLLER AND EMBEDDED MEMORY STORAGE APPARATUS USING THE SAME

CROSS-REFERENCE TO RELATED APPLICATION

This application claims the priority benefit of Taiwan application serial no. 99145897, filed Dec. 24, 2010. The entirety of the above-mentioned patent application is hereby incorporated by reference herein and made a part of this specification.

BACKGROUND

Technology Field

The present invention is related to a data management method, and more particularly, to a data management method for an embedded memory storage apparatus, and a memory controller and an embedded memory storage apparatus using the same.

Description of Related Art

Digital cameras, cell phones, and MP3 players have undergone rapid growth in recent years, so that consumer demand for storage media have also rapid increased. A rewritable non-volatile memory is one of the most adaptable memories for such electronic products due to its characteristics such as data non-volatility, low power consumption, small volume, non-mechanical structure, and high read-and-write speed. An embedded multi media card (eMMC) broadly applied in cell phones is a storage device that uses a flash memory as its storage medium. Therefore, the flash memory industry has become a very important part of the electronic industry in recent years.

In general, an eMMC applied in an electronic product is used to record an image file, e.g. an operating system, of the electronic product. Especially, for the facility of mass production, the image file is pre-recoded into the eMMC in advance, and then the eMMC having the pre-stored image file is soldered on a circuit board of an electronic product.

In a flash memory module, data is identified according to electric charges stored in memory cells. However, in some special circumstances to memory, e.g. when soldering, the high temperature will affect the electric charges stored in the memory cells (e.g. leakage of electricity). Thus, an error may occur accordingly in the data which is pre-stored in the eMMC.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data management method, a memory controller, and an embedded memory storage apparatus capable of re-storing data so as to efficiently use the storage space of the embedded memory storage apparatus.

The present invention provides a data management method capable of preventing data pre-stored in the embedded memory storage apparatus from losing due to soldering.

The present invention provides a memory controller and an embedded memory storage apparatus which execute a writing mechanism capable of preventing data pre-stored in the embedded memory storage apparatus from losing due to soldering.

An exemplary embodiment of the present invention provides a data management method for an embedded memory storage apparatus, wherein the embedded memory storage apparatus has a plurality of physical blocks and each of the physical blocks has a plurality of fast physical pages and a plurality of slow physical pages. The data management method comprises detecting a status of a state indication unit, wherein when only at least a portion of the fast physical pages is used to store data, the status of the state indication unit is marked as a first status, and when at least a portion of the fast physical pages and at least a portion of the slow physical page are both used to store the data, the status of the state indication unit is marked as a second status. The data management method further comprises when the status of the state indication unit is marked as the first status, automatically reading the stored data, using the fast physical pages and slow physical pages to re-store the read data and marking the status of the state as the second status.

The exemplary embodiment of the present invention provides a memory controller for managing a rewritable non-volatile memory module of an embedded memory storage apparatus, wherein the rewritable non-volatile memory module has a plurality of physical blocks and each of the physical blocks has a plurality of fast physical pages and a plurality of slow physical pages. This memory controller includes a host interface, a memory interface, and a memory management circuit. The host interface is configured for coupling to a host system. The memory interface is configured for coupling to the rewritable non-volatile memory module. The memory management circuit is coupled to the host interface and the memory interface. Herein, the memory management circuit is configure for detecting a status of a state indication unit, wherein when only at least a portion of the fast physical pages is used to store data, the status of the state indication unit is marked as a first status. Besides, when the status of the state indication unit is marked as the first status, the memory manager circuit automatically reads the stored data, uses the fast physical pages and slow physical pages to re-store the read data and marks the status of the state as a second status.

An exemplary embodiment of the present invention provides an embedded memory storage apparatus including a connector, a rewritable non-volatile memory storage module and a memory controller. The connector is configured for coupling to a host system. The rewritable non-volatile memory module has a plurality of physical blocks, and each of the physical blocks has a plurality of fast physical pages and a plurality of slow physical pages. The memory controller is coupled to the connector and the rewritable non-volatile memory module. Herein, the memory controller is configure for detecting a status of a state indication unit, wherein when only the fast physical pages are used to store data, the status of the state indication unit is marked as a first status. Besides, when the status of the state indication unit is marked as the first status, the memory controller automatically reads the stored data, uses the fast physical pages and the slow physical pages to re-store the read data and marks the status of the state as a second status.

An exemplary embodiment of the present invention provides a data management method for preventing predetermined data in an embedded memory storage apparatus from losing. The embedded memory storage apparatus has a plurality of physical blocks and each of the physical blocks has a plurality of fast physical pages and a plurality of slow physical pages. The data management method includes a burning step and a re-storing step. The burning step is used for only using the fast physical pages of the embedded memory storage apparatus to store the predetermined data and marking a status of a state indication unit as a first status, wherein the state indication unit is stored in the embedded memory storage apparatus. The re-storing step is used for using the fast physical pages and the slow physical pages of the embedded memory storage apparatus to re-store the predetermined data and marking the status of the state indication unit as a second status.

The exemplary embodiment of the present invention provides a memory controller for managing a rewritable non-volatile memory module of an embedded memory storage apparatus, wherein the rewritable non-volatile memory module has a plurality of physical blocks and each of the physical blocks has a plurality of fast physical pages and a plurality of slow physical pages. This memory controller includes a host interface, a memory interface, and a memory management circuit. The host interface is configured for coupling to a host system. The memory interface is configured for coupling to the rewritable non-volatile memory module. The memory management circuit is coupled to the host interface and the memory interface. Herein, the memory manager circuit is configured for only using the fast physical pages to store predetermined data and mark a status of a state indication unit as a first status. Besides, the memory manager circuit is further configured for using the fast physical pages and the slow physical pages to re-store the predetermined data and marking the status of the state indication unit as a second status. Moreover, the memory manager circuit stores the state indication unit in the rewritable non-volatile memory module.

An exemplary embodiment of the present invention provides an embedded memory storage apparatus including a connector, a rewritable non-volatile memory module and a memory controller. The connector is configured for coupling to a host system. The rewritable non-volatile memory module has a plurality of physical blocks, and each of the physical blocks has a plurality of fast physical pages and a plurality of slow physical pages. The memory controller is coupled to the connector and the rewritable non-volatile memory module. Herein, the memory controller is configured for only using the fast physical pages to store predetermined data and marking a status of a state indication unit as a first status, wherein the memory controller stores the state indication unit in the rewritable non-volatile memory. Besides, the memory controller is further configured for using the fast physical pages and the slow physical pages to re-store the predetermined data and marking the status of the state indication unit as a second status.

Based on the above, the data management method, the memory controller, and the embedded memory storage apparatus of the exemplary embodiments of the present invention are capable of effectively preventing the data pre-stored in the rewritable non-volatile memory module from losing due to soldering.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

In order to make the aforementioned and other features and advantages of the present invention more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
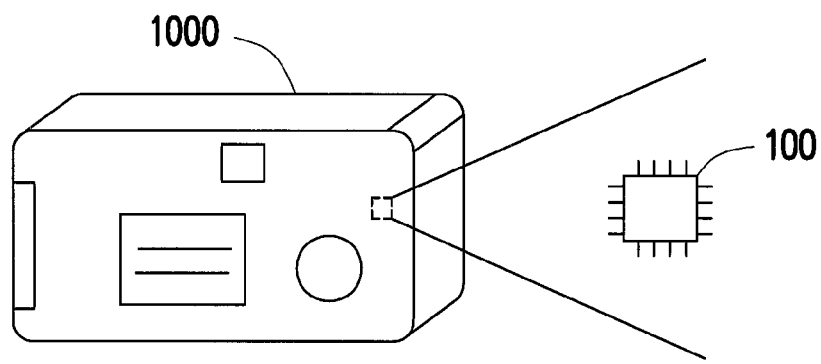
FIG. 1 is an electronic device and an embedded memory storage apparatus according to the first exemplary embodiment of the present invention.

The present invention provides a data management method capable of re-arranging data according to a storage status of an embedded memory storage apparatus so as to efficiently use the storage space of the embedded memory storage apparatus. Besides, the data management method of the present invention uses a burning mechanism to store predetermined data in more stable fast physical pages and uses re-storing mechanism to re-store the predetermined data in the fast physical pages and slow physical pages, such that an error bit is prevented due to special circumstances, e.g. in a high temperature causing by soldering. Several exemplary embodiments of the present invention will be described in details in the following with reference to accompany the drawings.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

FIG. 1 is an electronic device and an embedded memory storage apparatus according to the first exemplary embodiment of the present invention.

Referring to FIG. 1, the electronic device 1000 includes a micro-processor and a random access memory (RAM) (not shown). In the present exemplary embodiment, an embedded memory storage apparatus 100 is embedded on a circuit board of the electronic device 1000. Data can be written into the embedded memory storage apparatus 100 or can be read from the embedded memory storage apparatus 100 through operations of the micro-processor and the RAM. For example, the electronic device 1000 is a smart cell phone and the embedded memory storage apparatus 100 is configured for storing an operation system of the smart cell phone.

In the present exemplary embodiment, the embedded memory storage apparatus 100 may be an embedded multi media card (eMMC). However, it should be understood that the present invention is not limited thereto, and in another exemplary embodiment, the embedded memory storage apparatus 100 may be an embedded secure digital (eSD) card or another embedded non-volatile memory storage apparatus.

Figure 2:
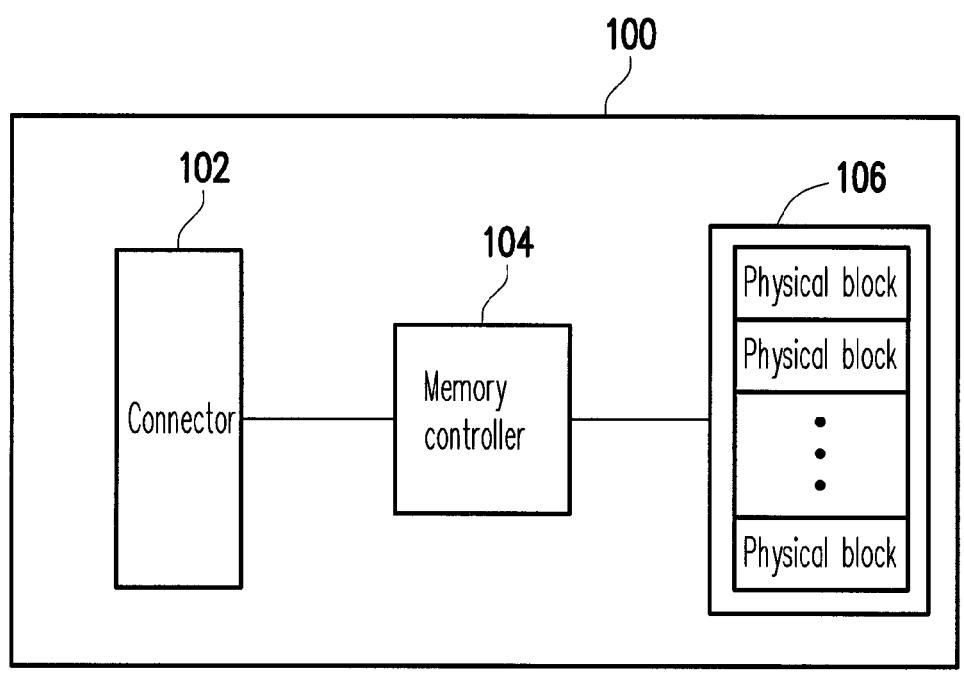
FIG. 2 is a schematic block diagram of the embedded memory storage apparatus in FIG. 1.

FIG. 2 is a schematic block diagram of the embedded memory storage apparatus in FIG. 1. Referring to FIG. 2, the embedded memory storage apparatus 100 includes a connector 102, a memory controller 104, and a rewritable non-volatile memory module 106. In an exemplary embodiment of the present invention, the connector 102, a memory controller 104, and the rewritable non-volatile memory module 106 can be packaged into a single chip.

In the exemplary embodiment, the connector 102 complies with an MMC standard. Nevertheless, it should be understood that the present invention is not limited thereto, and the connector 102 may complies with an SD standard or other embedded interface standards.

The memory controller 104 is configured for executing a plurality of logic gates or control commands implemented in a hardware form or a firmware form and performs various data operations such as data writing, reading, and erasing in the rewritable non-volatile memory module 106 according to commands of the electronic device 1000.

The rewritable non-volatile memory module 106 is coupled to the memory controller 104 and configured for storing data written by the electronic device 1000. The non-volatile memory module 106 has a plurality of physical blocks. Each of the physical blocks respectively has a plurality of physical pages, wherein the physical pages belonging to the same physical block can be written individually and must be erased simultaneously. In detail, each physical block is the smallest erasing unit. Namely, each physical block contains the least number of memory cells that are erased together. Besides, one physical page is the smallest programming unit. Namely, each physical page is the smallest unit for writing data. However, it should be understood that in another exemplary embodiment of the present invention, the smallest unit for writing data may be a physical sector or another size. For example, each physical block is composed of 128 physical pages. However, it should be understood that the present invention is not limited thereto, and each physical block may be composed of 256 physical pages or any number of physical pages. Each physical page includes a user data bit area and a redundancy bit area. The user data bit area is configured for storing user data, and the redundancy bit area is configured for storing system data (e.g., an error correcting code).

In the present exemplary embodiment, the rewritable non-volatile memory chip 106 is a multi-level cell (MLC) NAND flash memory chip module. Specifically, a NAND flash memory module may be classified into an MLC NAND flash memory or a single-level cell (SLC) NAND flash memory according to the number of data bits which each memory cell thereof is capable of storing. Each memory cell of the SLC NAND flash memory can only store one bit of data, and each memory cell of the MLC NAND flash memory can store at least two bits of data. For example, taking the 4-level memory cell NAND flash memory module as an example, each memory cell may store 2 bits of data (i.e., "11", "10", "00" or "01"). Accordingly, for a 4 level memory cell, a data writing operation may be divided into two stages. The first stage is to write data into a lower page, and the second stage is to write data into an upper page, wherein the writing speed of the lower page is faster than the writing speed of the upper page. Therefore, physical pages of the MLC NAND may be categorized into slow physical pages (i.e., the upper pages) and fast physical pages (i.e., the lower pages). In particular, compared with the upper pages, the lower pages have higher storage reliability. Similarly, in cases of 8-level memory cell NAND flash memory module or 16-level memory cell NAND flash memory module, the memory cells can store more bits of data and the data is written in more stages. Herein, the physical pages having the fastest writing speed are referred as the lower pages, and all other pages having slower writing speed are referred as the upper pages. For example, the upper pages include a plurality of pages having different writing speeds. Additionally, in another exemplary embodiment, the upper pages may be defined as the pages having the slowest writing speed, or the pages having the slowest writing speed and some of the pages having faster writing speeds than the slowest writing speed. For example, in an 8-level memory cell NAND flash memory module, the lower pages are the pages having the fastest and the second fastest writing speed, while the upper pages are the pages having the slowest and the second slowest writing speed.

Figure 3:
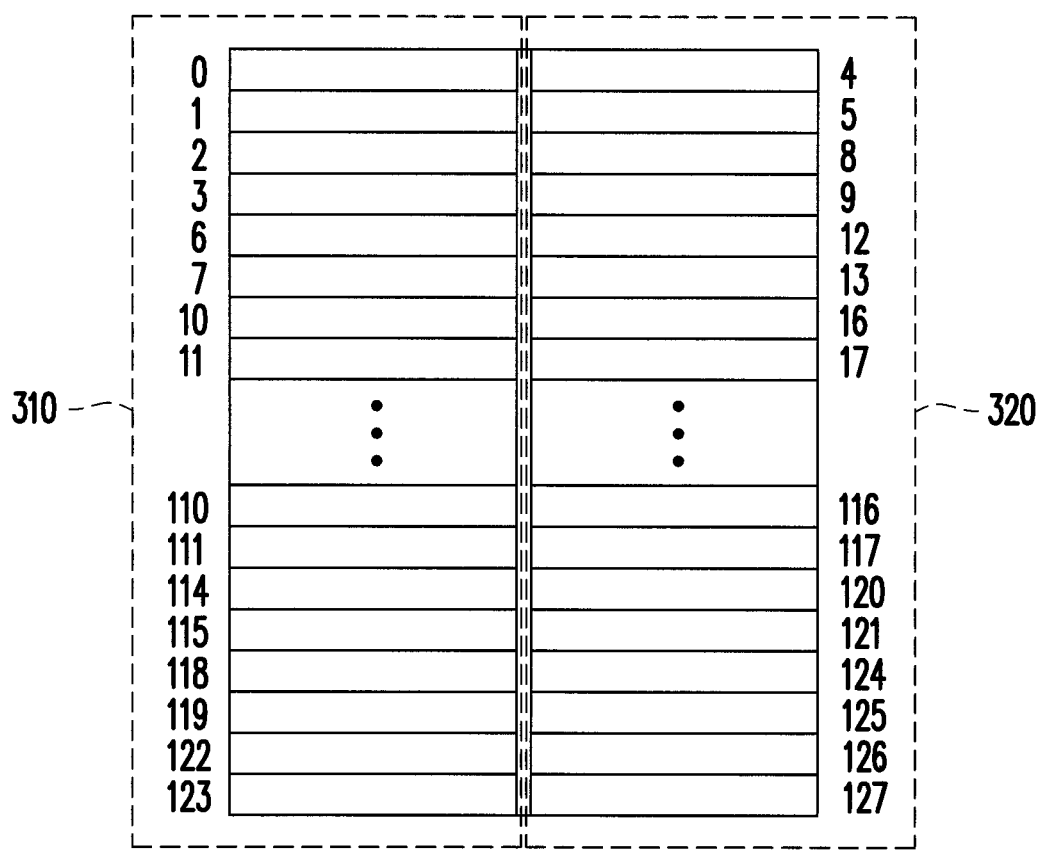
FIG. 3 is a schematic diagram of the physical blocks according to the first exemplary embodiment of the present invention.

FIG. 3 is a schematic diagram of the physical blocks according to the first exemplary embodiment of the present invention.

Referring to FIG. 3, the physical blocks of a 4-level memory cell flash memory module are classified into a plurality of fast physical pages 310 and a plurality of slow physical pages 320 according to writing property, wherein the writing speed of data written into the fast physical pages 310 is faster than the writing speed of data written into the slow physical pages 320, and the reliability of the data stored in the fast physical pages 310 is higher than the reliability of the data stored in the slow physical pages 320. Besides, data must be sequentially written according serial numbers of the physical pages.

Figure 4:
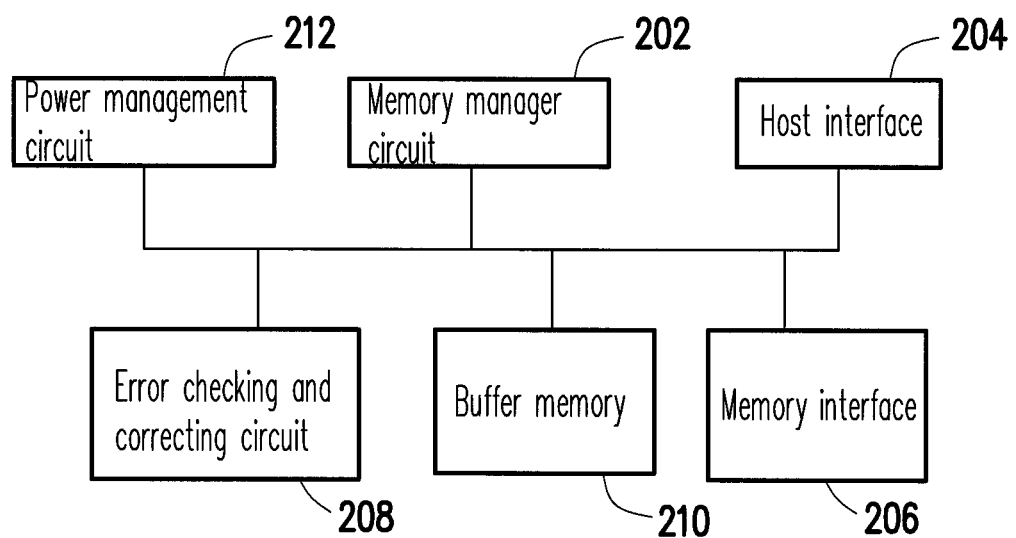
FIG. 4 is a schematic block diagram of the memory controller according to the first exemplary embodiment of the present invention.

FIG. 4 is a schematic block diagram of the memory controller according to the first exemplary embodiment of the present invention.

Referring FIG. 4, the memory controller 104 includes a memory management circuit 202, a host interface 204, and a memory interface 206.

The memory management circuit 202 is configured for controlling the whole operation of the memory controller 104. For example, the memory management circuit 202 may be composed of a plurality of control modules (e.g. a writing module, a reading module, and an erasing module, etc.), and the control modules of the memory management circuit 202 may performs various data operations such as data writing, reading, and erasing in the non-volatile memory module 106 according to commands of the electronic device 1000 when the memory storage apparatus 100 operates.

In the exemplary embodiment, the control modules of the memory management circuit 202 are implemented by program codes. For example, the memory management circuit 202 has a micro-processor unit (not shown) and a read-only memory (not shown), and these control commands are burnt into the read-only memory. Herein, these program codes are also referred to as a firmware. When the memory storage apparatus 100 operates, these program codes are run by the micro-processor unit to execute various operations such as data writing, reading, and erasing.

In another exemplary embodiment of the present invention, these program codes may be also stored in a specific area (e.g., a system area of the memory module exclusively used to store system data) of the rewritable non-volatile memory module 106. Additionally, the memory management circuit 202 has a micro-processor unit (not shown), a read-only memory (not shown), and a random access memory (not shown). Particularly, the read-only memory has a driver code, and when the memory controller 104 is enabled, the micro-processor unit runs the driver code to load the micro-programs, which are stored in the memory module 106, into the random access memory of the memory management circuit 202 first. Afterwards, the micro-processor unit runs the program codes so as to execute the operations of data writing, reading, and erasing, etc. Additionally, in another exemplary embodiment of the present invention, the control module of the memory management circuit 202 may be implemented in a hardware form.

The host interface 204 is coupled to the memory management circuit 202, and configured for receiving and identifying commands and data transmitted from the electronic device 1000. Namely, the commands and data from the electronic device 1000 are transmitted to the memory management circuit 202 through the host interface 204. In the exemplary embodiment, the host interface 204 complies with an eMMC standard. Nevertheless, it should be understood that the present invention is not limited thereto, and the host interface 204 may be an interface that complies with an eSD standard or another suitable data transmission standard.

The memory interface 206 is coupled to the memory management circuit 202 and configured for accessing the rewritable non-volatile memory module 106. Namely, data to be written into the rewritable non-volatile memory module 106 is converted by the memory interface 206 into a format acceptable to the rewritable non-volatile memory module 106.

An error checking and correcting (ECC) circuit 208 is coupled to the memory management circuit 202, and configured to execute an error checking and correcting procedure to ensure data accuracy. Specifically, when performing command writing, the error checking and correcting circuit 208 generates an error checking and correcting code corresponding to the data to be written and the memory management circuit 202 writes the data and the corresponding ECC code into the rewritable non-volatile memory module 106. Afterwards, when the memory management circuit 202 reads the data from the rewritable non-volatile memory module 106, the memory management circuit 202 simultaneously reads the ECC code corresponding to the data, and the error checking and correcting circuit 208 executes the ECC procedure for the read data based on the corresponding ECC code.

In an exemplary embodiment of the present invention, the memory controller 104 still includes a buffer memory 210. The buffer memory 210 is coupled to the memory management circuit 202 and configured for temporarily storing data and commands from the electronic device 1000 or data from the rewritable non-volatile memory module 106.

In an exemplary embodiment of the present invention, the memory controller 104 still includes a power management circuit 212. The power management circuit 212 is coupled to the memory management circuit 202 and configured for controlling the power of the embedded memory storage apparatus 100.

In the exemplary embodiment of the present invention, the memory management circuit 202 may store a state indication unit (e.g. a flag register) in the rewritable non-volatile memory module 106 and initially mark a status of the state indication unit as an initial state. For example, in the exemplary embodiment of the present invention, the memory manager circuit 202 groups the physical blocks into a storage area and a system area, and stores the state indication unit in the physical blocks. The physical blocks of the storage area is configured for storing user data (e.g. data accessed by the electronic device), and the physical blocks of the system area is configured for storing system data of the embedded memory storage apparatus 100 (e.g., the number of the physical blocks and the number of the physical pages, etc.).

In particular, when only using the fast physical pages of the physical blocks to store data, the memory manager circuit 202 marks the status of the state indication unit as a first status.

Figure 5:
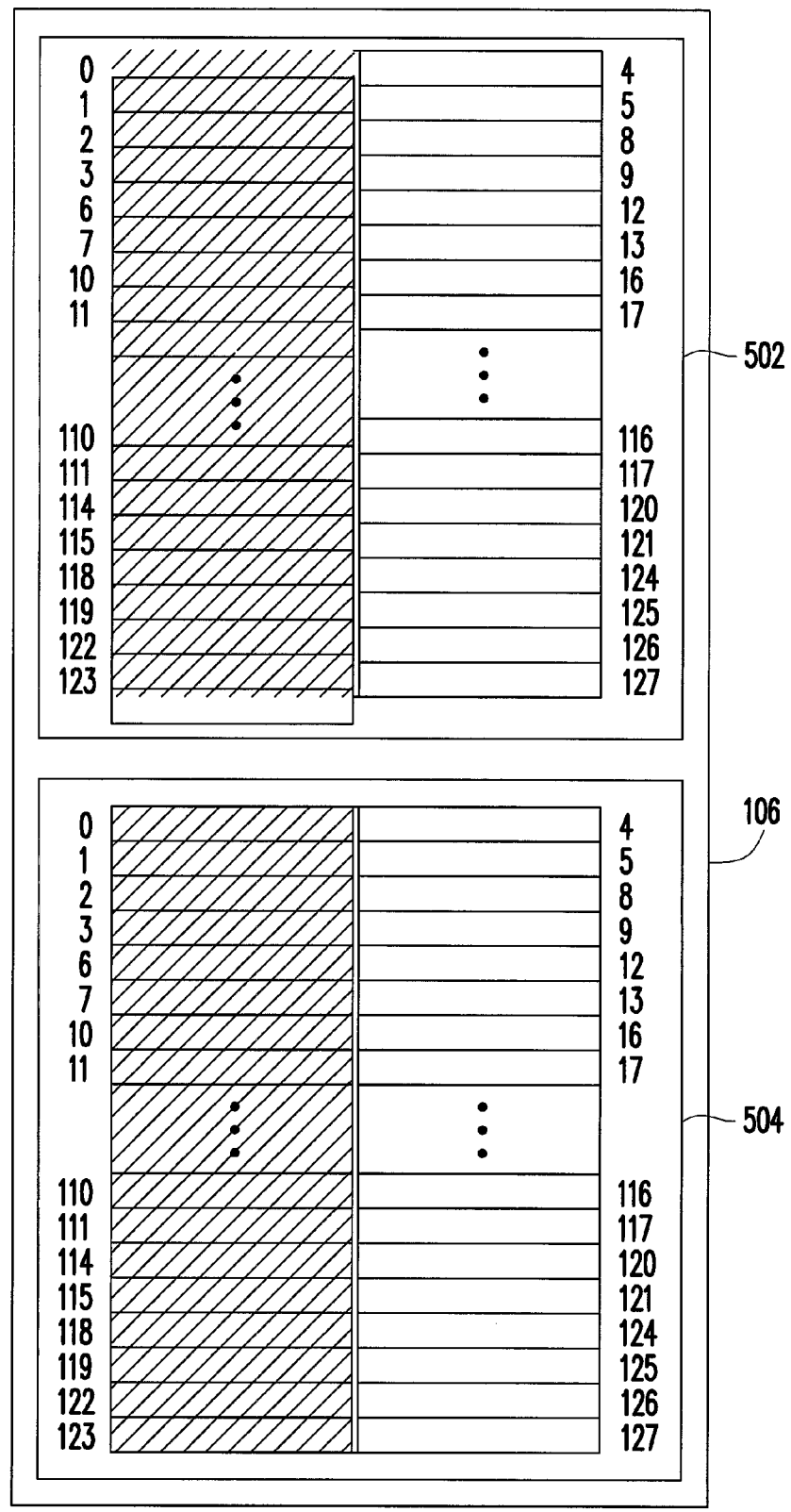
FIG. 5 is a schematic diagram illustrating data only stored in the fast physical pages according to the first exemplary embodiment of the present invention.

FIG. 5 is a schematic diagram illustrating data only stored in the fast physical pages according to the first exemplary embodiment of the present invention. For the convenience of description, here it is assumed that the size of the stored data equals to the size of the physical block and the rewritable non-volatile memory module 106 is composed of physical blocks 502 and physical blocks 504.

Referring to FIG. 5, the data originally should be stored in the slow physical pages of the physical blocks 502 is stored in the fast physical pages of the physical blocks 504. Since the data is stored in the fast physical pages (as areas marked with oblique lines shown in FIG. 5), the probability of occurring an error bit is lower.

In addition, when the fast physical pages and the slow physical pages of the physical blocks are normally used to store data, the memory manager circuit 202 marks the status of the state indication unit as a second status.

Figure 6:
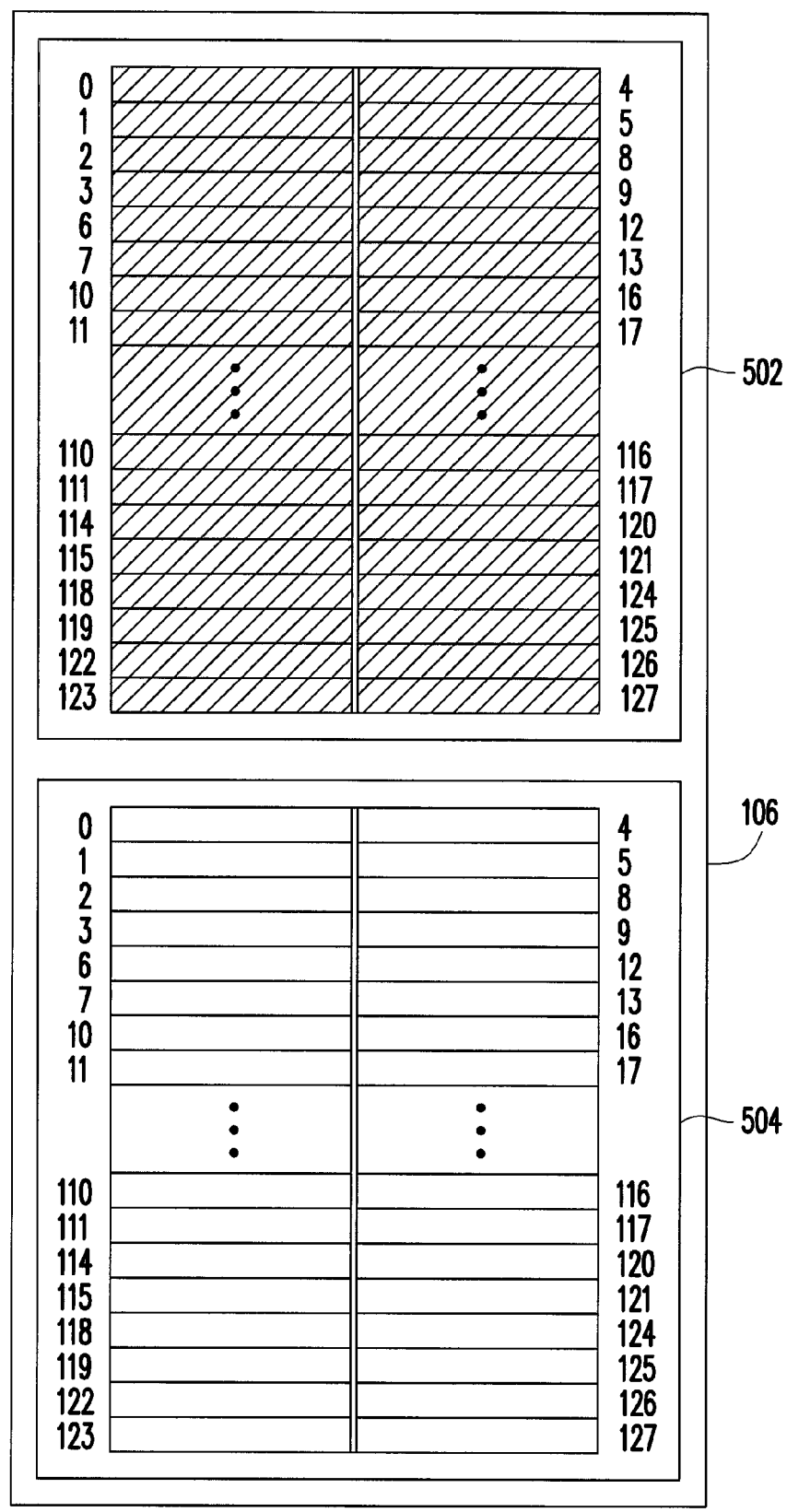
FIG. 6 is a schematic diagram illustrating data stored in the fast physical pages and the slow physical pages according to the first exemplary embodiment of the present invention.

FIG. 6 is a schematic diagram illustrating data stored in the fast physical pages and the slow physical pages according to the first exemplary embodiment of the present invention.

Referring to FIG. 6, the memory manager circuit 202 normally uses the fast physical pages and the slow physical page of the rewritable non-volatile memory module 106 to store data (as areas marked with oblique lines shown in FIG. 5). Since the fast physical pages and slow physical page are both used to store data, the storage space of the embedded memory storage apparatus 100 is sufficiently used. Herein, normally using the fast physical pages and the slow physical pages of the rewritable non-volatile memory module 106 to store data is also referred to as a normal storing mechanism.

In the exemplary embodiment of the present invention, when the electronic device 1000 or another external host system receives a predetermined vendor command, the memory manager circuit 202 detects the status of the state indication unit. When the status of the state indication unit is marked as the first status, the memory manager circuit 202 automatically reads the data originally stored in the embedded memory storage apparatus 100, and uses the fast physical pages and slow physical pages of the embedded memory storage apparatus 100 to re-store the data and marks the status of the state indication unit as the second status. In other words, when the predetermined vendor command is received, the memory manager circuit 202 automatically re-stores the data according the status of the embedded memory storage apparatus 100 so as to use the storage space more efficiently.

It should be noted that the predetermined vendor command here is a predetermined command configured for activating the re-storing mechanism. However, the present invention is not limited thereto. In another exemplary embodiment of the present invention, the memory manager circuit 202 may also activate the re-storing mechanism according to information of a standard command. For example, when the host system successively gives several write commands, the memory manager circuit 202 activates the re-storing mechanism. Alternatively, when a write command has a specific parameter, the memory manager circuit 202 activates the re-storing mechanism. Moreover, when the host system uses a standard command to be defined by a user, the memory manager circuit 202 activates the re-storing mechanism.

Figure 7:
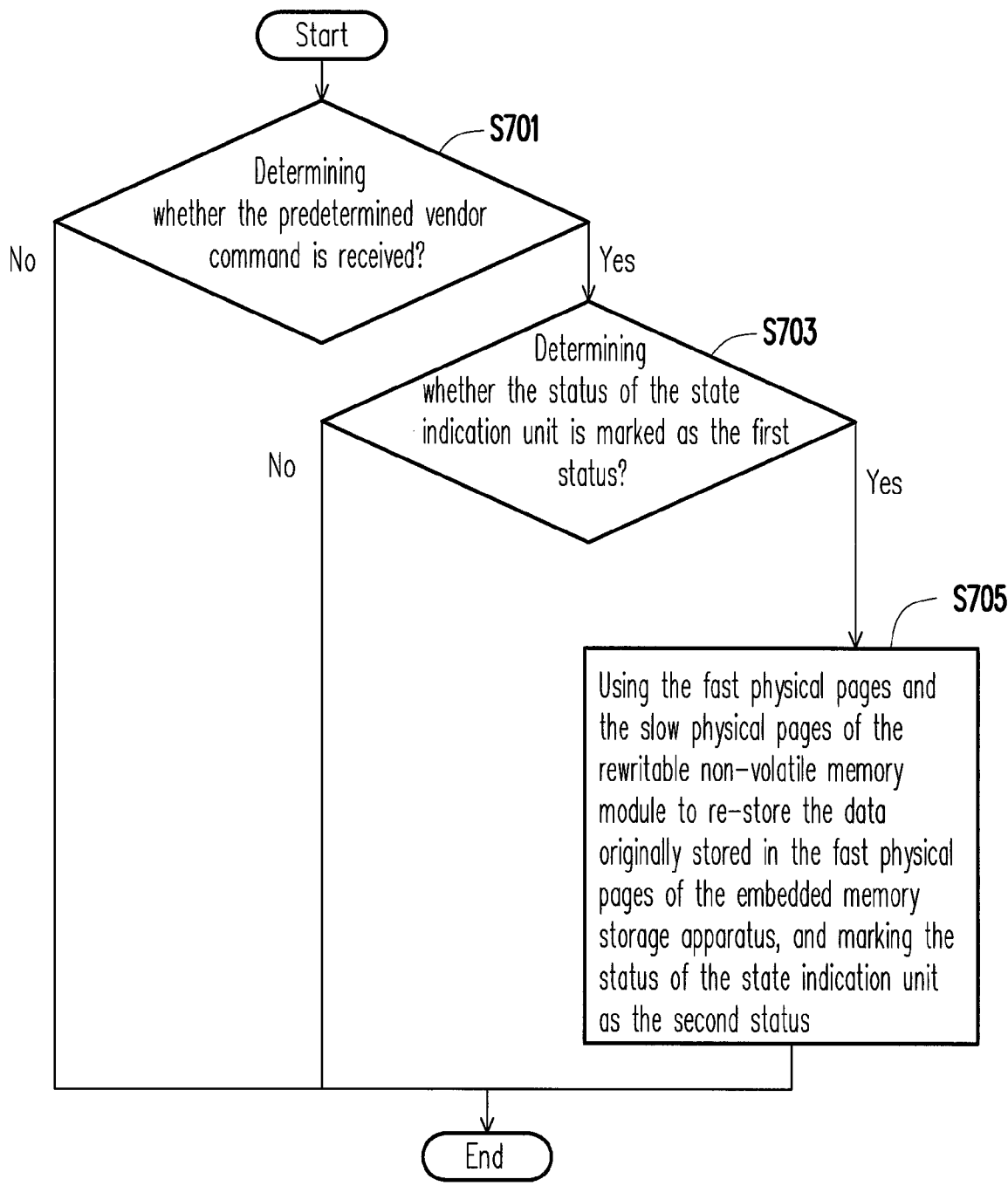
FIG. 7 is a flowchart of a data management method according to the first exemplary embodiment of the present invention.

FIG. 7 is a flowchart of a data management method according to the first exemplary embodiment of the present invention.

Referring to FIG. 7, in step S701, the memory management circuit 202 determines whether the predetermined vendor command is received. When the predetermined vendor command is received, in step S703, the memory manager circuit 202 determines whether the status of the state indication unit is marked as the first status.

When the status of the state indication unit is not marked as the first status, the process of FIG. 7 is terminated. When the status of the state indication unit is marked as the first status, in step S705, the memory manager circuit 202 uses the fast physical pages and the slow physical pages of the rewritable non-volatile memory module 106 to re-store the data originally stored in the fast physical pages of the embedded memory storage apparatus 106, and marks the status of the state indication unit as the second status.

[Second Exemplary Embodiment]

A structure of an embedded memory storage apparatus of the second exemplary embodiment is substantially the same as that of the embedded memory storage apparatus of the second exemplary embodiment, and the difference between the first exemplary embodiment and the first exemplary embodiment is described as follows with hardware components in FIG. 2 and FIG. 3.

In the second exemplary embodiment of the present invention, the embedded memory storage apparatus 100 is adhered to the circuit board of the electronic device 1000 in a soldering manner so as to couple to the micro-processor of the electronic device 1000. In addition, before the soldering, predetermined data (e.g. an image file of an operating system used in the electronic device 1000) is stored in the rewritable non-volatile memory module 106 via the burning mechanism.

In the burning mechanism, the memory controller 104 of the embedded memory storage apparatus 100 only uses the fast physical pages of the rewritable non-volatile memory module 106 to store the predetermined data. Specifically, when the predetermined vendor command is received from a host system (not shown), the memory manager circuit 202 identifies the status of the state indication unit. When the status of the state indication unit is marked as an initial status, the memory manager circuit 202 only uses the fast physical pages of the rewritable non-volatile memory module 106 to store data to be written by the host system (as shown in FIG. 5), and marks the status of the state indication unit as the first status. Accordingly, since the data is stored in the fast physical pages, the data is more stable and is not damaged when the embedded memory storage apparatus 100 is soldered on a working machine.

In addition, in the exemplary embodiment of the present invention, when the embedded memory storage apparatus 100 is in a normal temperature or more stable working environment (e.g. after passing a soldering machine), the predetermined data is re-stored in the rewritable non-volatile memory module 106 via the re-storing mechanism as described in the first exemplary embodiment. Namely, the memory manager circuit 202 uses the fast physical pages and the slow physical pages of the rewritable non-volatile memory module 106 to re-store the predetermined data originally stored in the fast physical pages of the embedded memory storage apparatus 106 (as shown in FIG. 6), and marks the status of the state indication unit as the second status.

As described above, the reliability of the fast physical pages is higher than the reliability of the slow physical pages, and therefore by only using the fast physical pages to store the data before soldering, the probability of occurring an error bit in the data stored in the embedded memory storage apparatus 100 due to high temperature of the soldering is reduced. Then, after the soldering, by using the fast physical pages and the slow physical pages to re-store the pre-stored data, the storage space of the embedded memory storage apparatus 100 is more efficiently used.

It should be noted that the predetermined vendor command here is a predetermined command configured to activate the burning mechanism and the re-storing mechanism. However, the present invention is not limited thereto. In another exemplary embodiment of the present invention, the memory manager circuit 202 may also activate the burning mechanism and the re-storing mechanism according to information of a standard command. For example, when the host system successively gives several write commands which the memory manager circuit 202 identifies as a predetermined pattern, the memory manager circuit 202 accordingly activates the burning mechanism and the re-storing mechanism. Alternatively, when a write command comprises a specific parameter, the memory manager circuit 202 activates the burning mechanism and re-storing mechanism. Moreover, when the host system uses a standard command to be defined by a user, the memory manager circuit 202 activates the burning mechanism and the re-storing mechanism.

Figure 8:
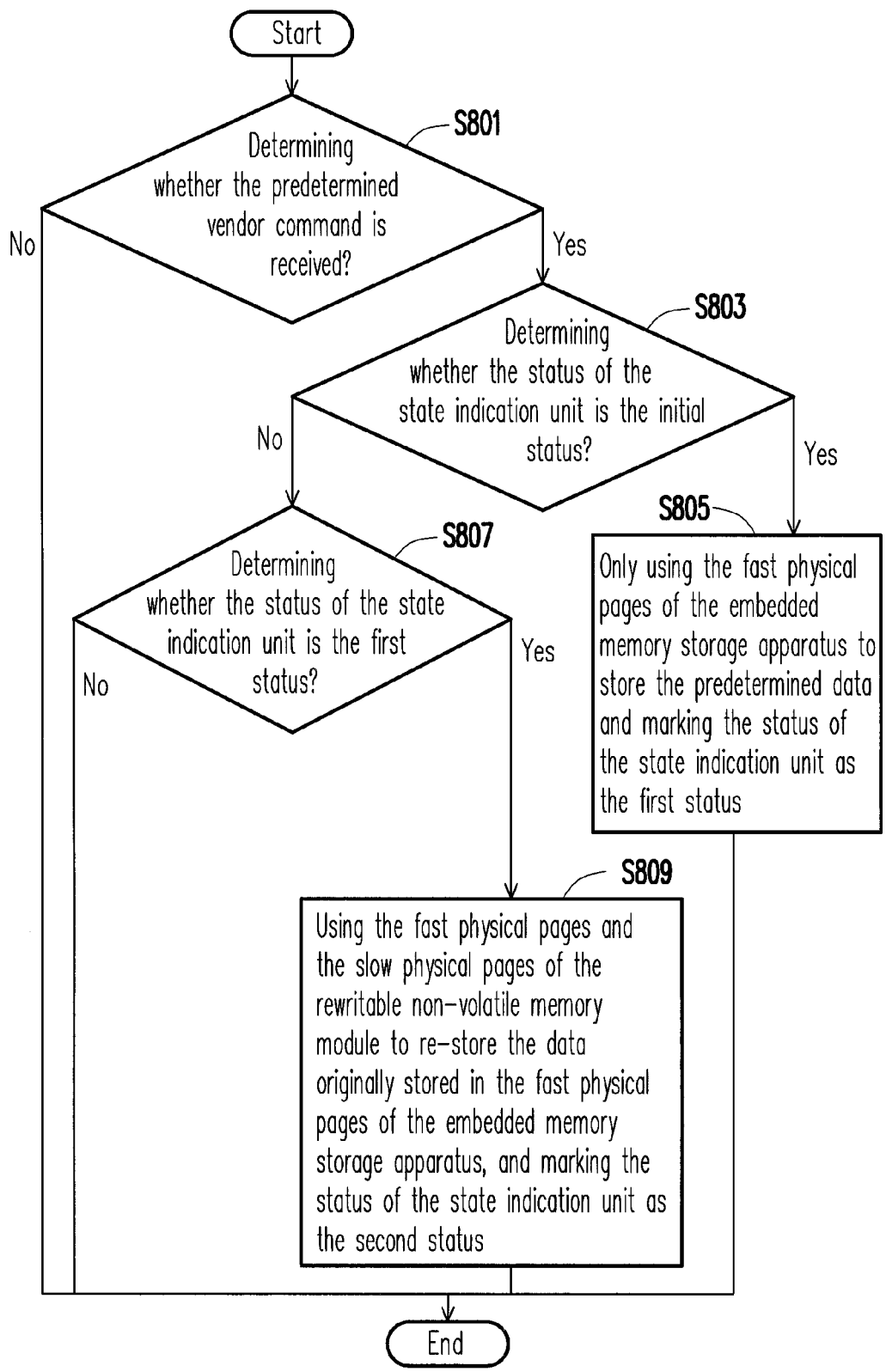
FIG. 8 is a flowchart of a data management method according to the second exemplary embodiment of the present invention.

FIG. 8 is a flowchart of a data management method according to the second exemplary embodiment of the present invention. Referring to FIG. 8, in step S801, whether the predetermined vendor command is received is determined.

When the predetermined vendor command is not received, the process of FIG. 8 is terminated.

When the predetermined vendor command is received, in step S803, whether the status of the state indication unit is the initial status is determined.

When the status of the state indication unit is the initial status, in step S805, only the fast physical pages of the embedded memory storage apparatus are used to store the predetermined data, and the status of the state indication unit is marked as the first status. Herein, step S805 is also referred to as a burning step.

When the status of the state indication unit is not the initial status, in step S807, whether the status of the state indication unit is the first status is determined.

When the status of the state indication unit is the first status, in step S809, the fast physical pages and the slow physical pages of the embedded memory storage apparatus are used to re-store the predetermined data originally stored in the embedded memory storage apparatus, and the status of the state indication unit is marked as the second status. Herein, step S809 is also referred to as a re-storing step.

When the status of the state indication unit is not the first status, the process of FIG. 8 is terminated. In other words, when the status of the state indication unit is not the initial status or the first status and the predetermined vendor command is received, the received predetermined vendor command is ignored.

As described above, the burning mechanism or the re-storing mechanism may be activated according to the information of the standard command. Therefore, in another exemplary embodiment of the present invention, step S801 of FIG. 8 may be replaced by determining whether a standard command belonging to a predetermined pattern is received.

[Third Embodiment]

According to the data management method of the second exemplary embodiment, the re-storing step is executed to re-store the whole predetermined data in the physical blocks of the embedded memory storage apparatus after soldering. However, in a data management method of the third exemplary embodiment, the predetermined data stored in the fast physical pages are re-stored in batches when the write commands are subsequently executed, and the whole predetermined data are not immediately re-stored in the physical blocks of the embedded memory storage apparatus after soldering. A structure of an embedded memory storage apparatus of the third exemplary embodiment is substantially the same as that of the embedded memory storage apparatus of the first exemplary embodiment, and the difference between the third exemplary embodiment and the first exemplary embodiment is described as follows with hardware components in FIG. 2 and FIG. 3.

Similarly, in the third exemplary embodiment, when memory controller 104 receives the predetermined vendor command and the status of the state indication unit is marked as the initial status, the memory manager circuit 202 only uses the fast physical pages of the rewritable non-volatile memory module 106 to store the predetermined data (as shown in FIG. 5) and marks the status of the state indication unit as the first status.

Afterwards, when the memory controller 104 receives the write command or a turn-on signal, the memory manager circuit 202 determines whether the physical pages to be written store the predetermined data written via the burning mechanism. Herein, the determination may be performed via, for example, a predetermined data recover table. When the physical pages to be written have already store the predetermined data written via the burning mechanism, the memory manager circuit 202 re-arranges the predetermined data while the write command is executed. In other words, when the memory manager circuit 202 executes the write command, the memory manager circuit 202 also uses the slow physical pages and the fast physical pages to re-store the predetermined data. Namely, the memory manager circuit 202 re-stores the predetermined data written via the burning mechanism into the physical blocks in batches when a data writing operation is subsequently required.

In the third exemplary embodiment, the memory manager circuit 202 establishes the predetermined data recover table configured to record the physical blocks which store the predetermined data written via the burning mechanism. Moreover, when the predetermined data stored in some physical page has been re-stored via the normal storing mechanism, the memory manager circuit 202 records such information in the predetermined data recover table. In other words, the memory manager circuit 202 re-stores the pre-determined data which is not stored via the normal storing mechanism according to the predetermined data recover table when executing the write command.

Figure 9:
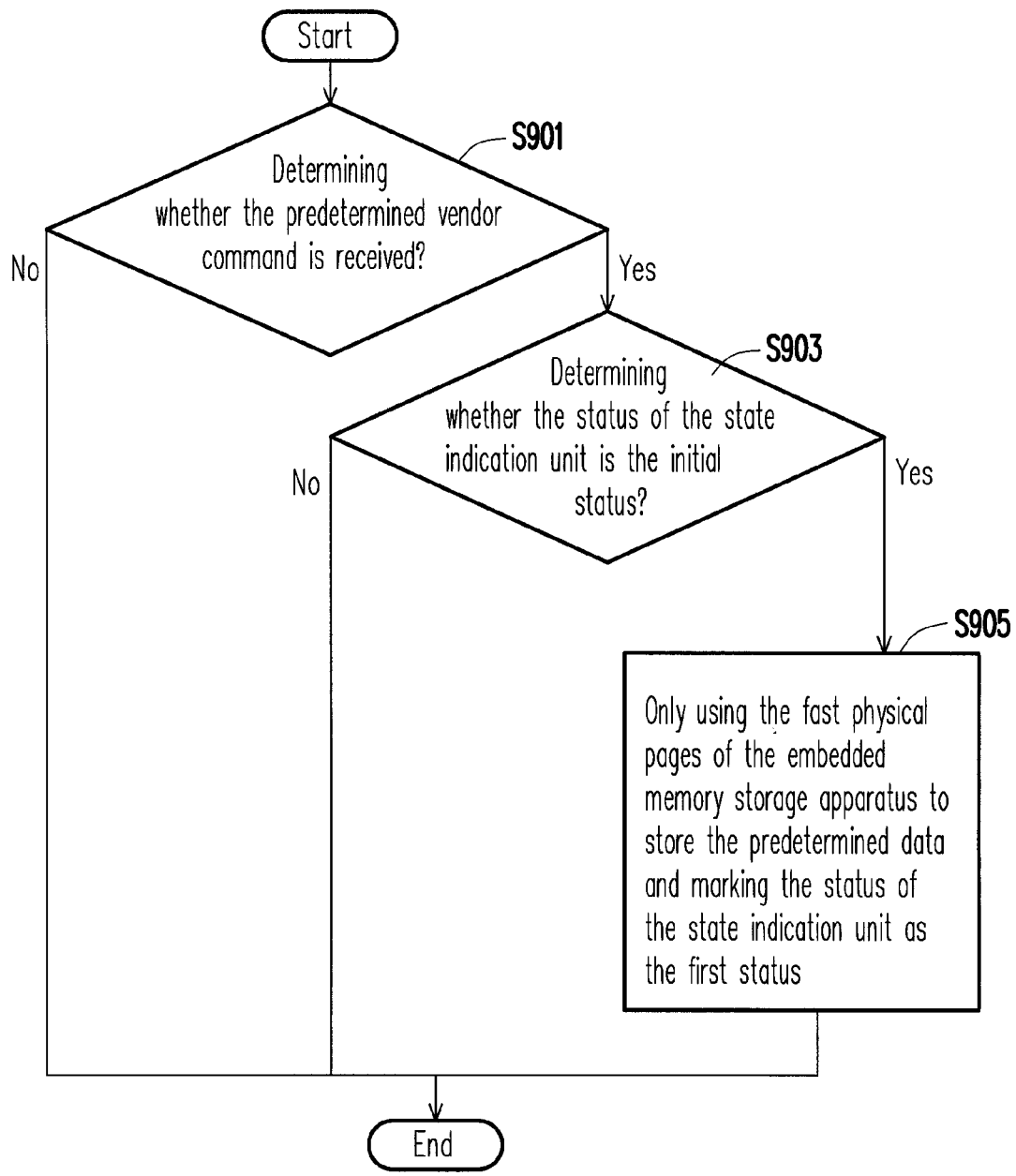
FIG. 9 is a flow chart illustrating a burning step according to the third exemplary embodiment of the present invention.

FIG. 9 is a flow chart illustrating a burning step according to the third exemplary embodiment of the present invention.

Referring to FIG. 9, in step S901, whether the predetermined vendor command is received is determined.

When the predetermined vendor command is not received, the process of FIG. 9 is terminated.

When the predetermined vendor command is received, in step S903, whether the status of the state indication unit is the initial status is determined.

When the status of the state indication unit is the initial status, in step S905, only the fast physical pages of the embedded memory storage apparatus are used to store the predetermined data, and the status of the state indication unit is marked as the first status. Herein, step S905 is also referred as to the burning step.

Figure 10:
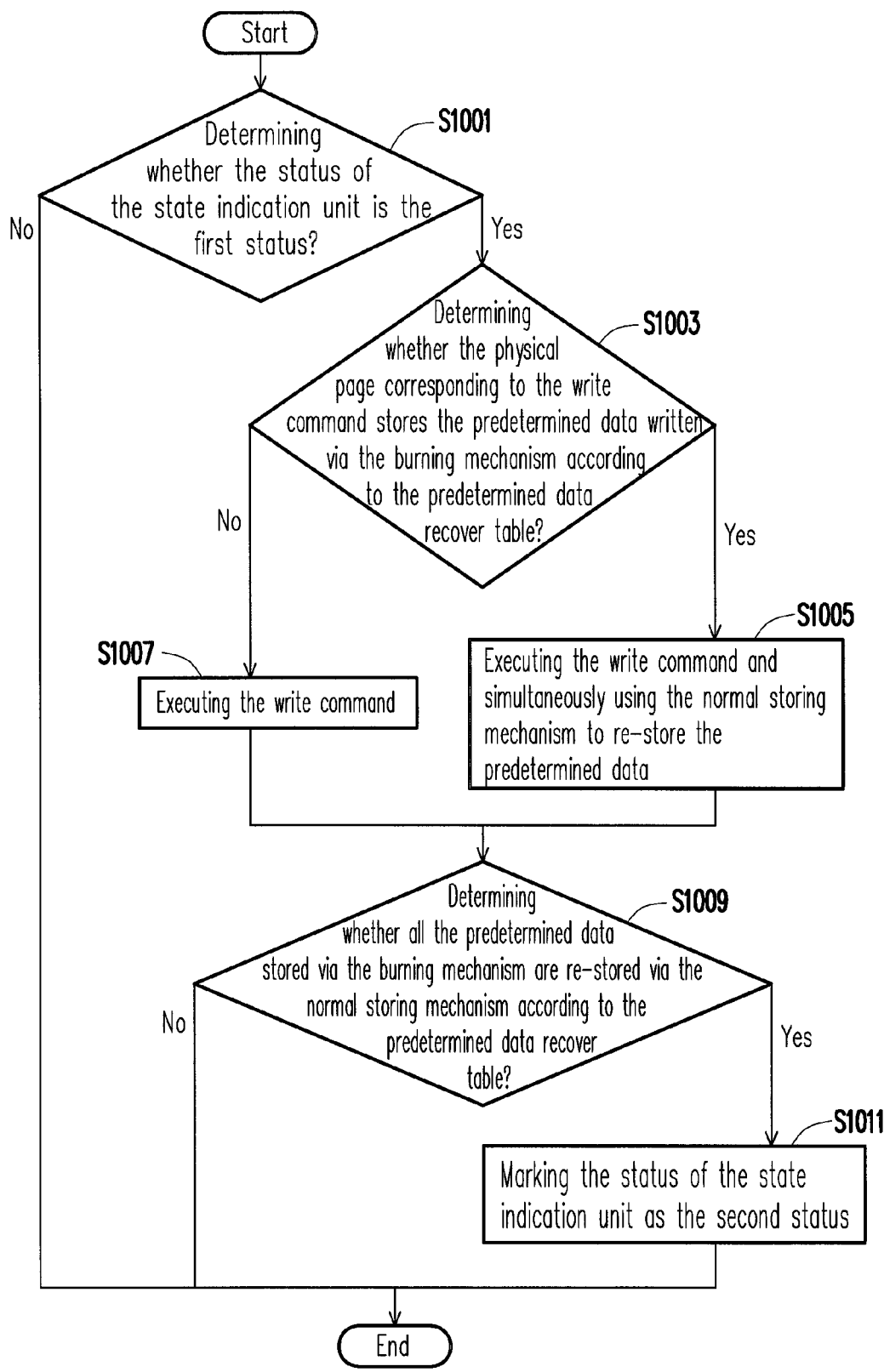
FIG. 10 is a flowchart of re-storing the predetermined data when the write command is executed according to the third exemplary embodiment of the present invention.

FIG. 10 is a flowchart of re-storing the predetermined data when the write command is executed according to the third exemplary embodiment of the present invention.

Referring to FIG. 10, when the write command is received, in step S1101, whether the status of the state indication unit is the first status is determined.

When the status of the state indication unit is the first status, in step S1003, the memory manager circuit 202 determines whether the physical page corresponding to the write command stores the predetermined data written via the burning mechanism (i.e., the predetermined data not re-stored via the normal storing mechanism) according to the predetermined data recover table.

When the physical page corresponding to the write command stores the predetermined data written via the burning mechanism, in step S1005, the write command is executed and the normal storing mechanism is used simultaneously to re-store the predetermined data.

When the physical page corresponding to the write command does not store the predetermined data written via the recording mechanism, in step S1007, the write command is executed.

Then, in step S1009, whether all the predetermined data stored via the burning mechanism are re-stored via the normal storing mechanism is determined according to the predetermined data recover table.

When the all predetermined data are re-stored via the normal storing mechanism, in step S1011, the status of the state indication unit is marked as the second status. Afterwards, the process of FIG. 10 is terminated.

It should be noted that in another exemplary embodiment of the present invention, when a wear-leveling procedure of the physical blocks is executed and thereby the data are required to be moved, the memory manager circuit 202 may simultaneously re-store the predetermined data which are written via the recording mechanism. Thus, in another exemplary embodiment of the present invention, step S1001 and step S1003 of FIG. 10 may be replaced by determining whether the wear-leveling procedure is executed and whether data to be moved is written via the burning mechanism. The wear-leveling procedure is well-known to those skilled in the art, and the operation thereof is thus not illustrated herein.

In summary, according to the data management method of the exemplary embodiment of the present invention, the fast physical pages and the slow physical pages are used to re-store the data which are originally only stored in the fast physical pages, and therefore the storage space of the embedded memory storage apparatus is efficiently used. Besides, according to the exemplary embodiment of the present invention, only the more stable fast physical pages of the embedded memory storage apparatus are used to store the predetermined data in the burning mechanism. Afterwards, when the embedded memory storage apparatus is adhered to the circuit board of the electronic device by soldering, data errors occur due to the high temperature can be effectively prevented. In addition, after the soldering, the embedded memory storage apparatus is capable of accessing the data normally according to commands from the electronic device via the above normal storing mechanism.

Based on the above, the data management method, the memory controller, and the embedded memory storage apparatus of the exemplary embodiment of the present invention are capable of preventing data loss causing by soldering effectively. The previously described exemplary embodiments of the present invention have the advantages aforementioned, wherein the advantages aforementioned not required in all versions of the present invention.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data management method for an embedded memory storage apparatus, wherein the embedded memory storage apparatus has a plurality of physical blocks and each of the physical blocks has a plurality of fast physical pages and a plurality of slow physical pages, the management method comprising:
   initially marking a status of a state indication unit as an initial status;
   executing a burning step of a high temperature process, where the burning step is configured to use only at least one of the fast physical pages of the embedded memory storage apparatus to store predetermined data;
   marking the status of the state indication unit as a first status;
   reading the predetermined data, wherein the predetermined data is stored only in at least one of the fast physical pages;
   detecting a status of the state indication unit; and
   re-storing the predetermined data by executing a plurality of write commands from a host system in batches into at least one of the fast physical pages and at least one of the slow physical pages after the high temperature process if the status of the state indication unit state is detected as the first status.

2. The data management method as claimed in claim 1, further comprising:
   determining whether a predetermined vendor command is received from the host system;
   determining whether the status of the state indication unit is the initial status; and
   executing the burning step if the predetermined vendor command is received and the status of the state indication unit is the initial status,
   wherein the state indication unit is stored in the embedded memory storage apparatus.

3. The data management method as claimed in claim 2, further comprising:
   if the status of the state indication unit is marked as the first status, reading the predetermined data, performing a re-storing step using both at least one of the fast physical pages and at least one of the slow physical pages to re-store the predetermined data; and
   marking the status of the state as a second status.

4. The data management method as claimed in claim 3, further comprising:
   determining whether a predetermined vendor command is received from the host system;
   determining whether the status of the state indication unit is the first status; and
   executing the re-storing step if the predetermined vendor command is received and the status of the state indication unit is the first status.

5. The data management method as claimed in claim 1, further comprising:
   receiving at least one standard command from the host system;
   determining whether the at least one standard command belongs to a predetermined pattern; and
   detecting the status of the state indication unit only if the at least one standard command belongs to the predetermined pattern.

6. The data management method as claimed in claim 1, wherein the predetermined data is an image file (ISO file) or an operation system file.

7. An embedded memory storage apparatus, comprising:
   a connector, configured to couple to a host system;
   a rewritable non-volatile memory module, having a plurality of physical blocks, and each of the physical blocks has a plurality of fast physical pages and a plurality of slow physical pages; and
   a memory controller, coupled to the connector and the rewritable non-volatile memory module,
   wherein the memory controller is further configured to initially mark a status of a state indication unit as an initial status,
   wherein the memory controller is configured to execute a burning step of a high temperature process, where the burning step is configured to use only at least one of the fast physical pages of the embedded memory storage apparatus to store predetermined data,
   wherein the memory controller is configured to mark the status of the state indication unit as a first status,
   wherein the memory controller is configured to read the predetermined data, wherein the predetermined data is stored only in at least one of the fast physical pages,
   wherein the memory controller is further configured to detect the status of the state indication unit, wherein the memory controller is further configured to re-store the predetermined data by executing a plurality of write commands from the host system in batches into at least one of the fast physical pages and at least one of the slow physical pages after the high temperature process if the status of the state indication unit state is detected as the first status.

8. The embedded memory storage apparatus as claimed in claim 7,
wherein the memory controller is further configured to determine whether a predetermined vendor command is received from the host system and determine whether the status of the state indication unit is the initial status,
wherein if the vendor command is received and the status of the state indication unit is the initial status, the memory controller executes the burning step, wherein the state indication unit is stored in the embedded memory storage apparatus.

9. The embedded memory storage apparatus as claimed in claim 8, wherein the memory controller is further configured to, if the status of the state indication unit is marked as the first status, read the predetermined data, use both at least one of the fast physical pages and at least one of the slow physical pages to re-store the predetermined data and mark the status of the state as a second status.

10. The embedded memory storage apparatus as claimed in claim 9, wherein the memory controller is further configured to determine whether a predetermined vendor command is received from the host system, and determine whether the status of the state indication unit is the first status,
wherein if the predetermined vendor command is received and the status of the state indication unit is the first status, the memory controller uses both at least one of the fast physical pages and at least one of the slow physical pages to re-store the predetermined data.

11. The embedded memory storage apparatus as claimed in claim 7, wherein the memory controller is further configured to receive at least one standard command from the host system and determine whether the at least one standard command belongs to a predetermined pattern,
wherein the memory controller detects the status of the state indication unit only if the at least one standard command belongs to the predetermined pattern.

12. The embedded memory storage apparatus as claimed in claim 7, wherein the predetermined data is an image file (ISO file) or an operation system file.

13. A method for manufacturing an embedded memory storage apparatus wherein the embedded memory storage apparatus has a plurality of physical blocks and each of the physical blocks has a plurality of fast physical pages and a plurality of slow physical pages, the method comprising:
initially marking a status of a state indication unit as an initial status;
using only at least one of the fast physical pages of the embedded memory storage apparatus to store predetermined data and marking the status of the state indication unit as a first status from the initial status;
processing the embedded memory storage apparatus with a high temperature process;
detecting the status of the state indication unit, wherein the status of the state indication unit is marked as a first status if only at least one of the fast physical pages is used to store the predetermined data; and
using both at least one of the fast physical pages and at least one of the slow physical pages to re-store the predetermined data after the step of processing the embedded memory storage apparatus with the high temperature process, and marking the status of the state indication unit as a second status,
during executing of a plurality of write commands from a host system, re-storing the predetermined data in batches into the at least one of the fast physical pages and the at least one of the slow physical pages if the status of a state indication unit state is detected as the first status.

14. The method as claimed in claim 13, wherein the high temperature process includes: adhering the embedded memory storage apparatus to a circuit board with a soldering manner.

15. The method as claimed in claim 13, further comprising:
receiving at least one standard command from the host system;
determining whether the at least one standard command belongs to a predetermined pattern; and
using both the at least one of the fast physical pages and the at least one of the slow physical pages to re-store the predetermined data only if the at least one standard command belongs to the predetermined pattern.

16. The method as claimed in claim 13, wherein the predetermined data is an image file (ISO file) or an operation system file.

17. An embedded memory storage apparatus, comprising:
a connector, configured to couple to a host system;
a rewritable non-volatile memory module, having a plurality of physical blocks, and each of the physical blocks has a plurality of fast physical pages and a plurality of slow physical pages; and
a memory controller, coupled to the connector and the rewritable non-volatile memory module, and configured to initially mark a status of a state indication unit as an initial status,
wherein memory controller is further configured to only use at least one of the fast physical pages of the embedded memory storage apparatus to store predetermined data before the embedded memory storage apparatus is processed with a high temperature process, and mark the status of the state indication unit as a first status from the initial status,
wherein after the embedded memory storage apparatus is processed with the high temperature process, the memory controller is further configured to detect a status of a state indication unit,
wherein the memory controller is further configured to use both at least one of the fast physical pages and at least one of the slow physical pages to re-store the predetermined data, and the memory controller marks the status of the state indication unit as a second status,
wherein the memory controller re-stores the predetermined data in batches into the at least one of the fast physical pages and the at least one of the slow physical pages during executing of a plurality of write commands from the host system if the status of a state indication unit state is detected as the first status.

18. The embedded memory storage apparatus as claimed in claim 17, wherein after the embedded memory storage apparatus is processed with a high temperature process, the embedded memory storage apparatus is adhered to a circuit board with a soldering manner.

19. The embedded memory storage apparatus as claimed in claim 17, wherein the memory controller is further configured to receive at least one standard command from the host system and determine whether the at least one standard command belongs to a predetermined pattern, only if the at least one standard command belongs to the predetermined pattern, the memory controller uses both the at least one of the fast physical pages and the at least one of the slow physical pages to re-store the predetermined data.

20. The embedded memory storage apparatus as claimed in claim 17, wherein the predetermined data is an image file (ISO file) or an operation system file.

21. A data management method for an embedded memory storage apparatus, wherein the embedded memory storage apparatus has a plurality of physical blocks and each of the physical blocks has a plurality of fast physical pages and a plurality of slow physical pages, the management method comprising:

initially marking a status of a state indication unit as an initial status;

processing the embedded memory storage apparatus with a high temperature process;

detecting the status of the state indication unit, wherein the status of the state indication unit is marked as a first status from the initial status if only at least one of the fast physical pages is used to store the predetermined data; and if the status of the state indication unit is the first status, re-storing the predetermined data by executing a plurality of write commands from a host system in batches into at least one of the fast physical pages and at least one of the slow physical pages after the high temperature process.

* * * * *